(12) United States Patent
Davies et al.

(10) Patent No.: US 8,886,173 B2
(45) Date of Patent: Nov. 11, 2014

(54) SYSTEM AND METHOD FOR MANAGING THE RESOURCES OF A SECONDARY STATION IN A MOBILE NETWORK

(75) Inventors: Robert James Davies, Milton (GB); Timothy James Moulsley, Caterham (GB); Choo Chiap Chiau, Hertfordshire (GB)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 13/695,660

(22) PCT Filed: Apr. 28, 2011

(86) PCT No.: PCT/IB2011/051881
§ 371 (c)(1),
(2), (4) Date: Nov. 1, 2012

(87) PCT Pub. No.: WO2011/138716
PCT Pub. Date: Nov. 10, 2011

(65) Prior Publication Data
US 2013/0053044 A1     Feb. 28, 2013

(30) Foreign Application Priority Data

May 3, 2010  (EP) .................................... 10305470
Jun. 21, 2010 (EP) .................................... 10305661

(51) Int. Cl.
*H04L 29/06*    (2006.01)
*H04M 1/725*    (2006.01)
*H04W 24/00*    (2009.01)
*H04W 52/02*    (2009.01)
*H04W 84/04*    (2009.01)
*H04W 72/04*    (2009.01)

(52) U.S. Cl.
CPC ........ *H04W 72/048* (2013.01); *H04W 52/0261* (2013.01); *H04W 84/045* (2013.01); *H04W 72/0413* (2013.01)
USPC ................... 455/414.3; 455/412.2; 455/456.4

(58) Field of Classification Search
USPC ............. 455/412.1, 412.2, 432.1, 432.3, 433, 455/435.1, 435.2, 435.3, 456.1, 456.2, 455/456.3, 456.4, 456.5, 456.6, 414.1, 455/414.2, 414.3
See application file for complete search history.

(56) References Cited

U.S. PATENT DOCUMENTS

| | | | | |
|---|---|---|---|---|
| 6,263,211 | B1 * | 7/2001 | Brunner et al. | 455/464 |
| 6,603,969 | B1 * | 8/2003 | Vuoristo et al. | 455/433 |
| 6,701,144 | B2 * | 3/2004 | Kirbas et al. | 455/417 |
| 6,721,542 | B1 * | 4/2004 | Anttila et al. | 455/68 |

(Continued)

FOREIGN PATENT DOCUMENTS

WO    2007050687 A2    5/2007

OTHER PUBLICATIONS

Philips "Operating Proviles for UE", 3GPP TSG RAN WG2 #70, R2-103168, May 7, 2010, pp. 1-3.

(Continued)

*Primary Examiner* — Christopher M Brandt

(57) ABSTRACT

The invention relates to a method for operating a secondary station (110a, 110b), said secondary station (110a, 110b) comprising communication means for communicating with a primary station (100), the method comprising the step (a) of the secondary station (110a, 110b) signaling at least one preferred operating profile (S205) out of a plurality of available operating profiles in response to an event (S204).

15 Claims, 2 Drawing Sheets

(56) References Cited

U.S. PATENT DOCUMENTS

| | | | |
|---|---|---|---|
| 7,061,898 B2* | 6/2006 | Hashem et al. | 370/342 |
| 7,221,939 B2* | 5/2007 | Ylitalo et al. | 455/435.1 |
| 8,365,162 B2* | 1/2013 | Rauma | 717/173 |
| 8,494,509 B2* | 7/2013 | Serafat et al. | 455/419 |
| 8,588,730 B2* | 11/2013 | Zohar | 455/404.1 |
| 2002/0160811 A1* | 10/2002 | Jannette et al. | 455/560 |
| 2003/0207683 A1* | 11/2003 | Lempio et al. | 455/422.1 |
| 2004/0204181 A1 | 10/2004 | Cromer et al. | |
| 2005/0170845 A1* | 8/2005 | Moran | 455/456.1 |
| 2006/0030316 A1* | 2/2006 | Lando | 455/432.3 |
| 2006/0197660 A1* | 9/2006 | Luebke et al. | 340/539.26 |
| 2007/0259655 A1* | 11/2007 | Minborg et al. | 455/415 |
| 2008/0220759 A1* | 9/2008 | Norrman | 455/419 |
| 2009/0239534 A1* | 9/2009 | Jang et al. | 455/435.1 |
| 2011/0086611 A1* | 4/2011 | Klein et al. | 455/407 |

OTHER PUBLICATIONS

Vodafone Group, "New UE Capability for RRM Optimisation", 3GPP TSG RAN WG2 #48, R2-051764, Aug. 29, 2005, pp. 1-3.

* cited by examiner

SYSTEM AND METHOD FOR MANAGING THE RESOURCES OF A SECONDARY STATION IN A MOBILE NETWORK

FIELD OF THE INVENTION

The present invention relates to a method for communicating in a mobile communication network including a primary station communicating with at least one secondary station.

This invention is, for example, relevant for mobile telecommunication networks or for example in other networks including radio stations being handheld devices, or wireless sensor nodes.

BACKGROUND OF THE INVENTION

In mobile communication networks like GSM, UMTS or Long Term Evolution (LTE) networks, as illustrated on FIG. 1, a primary station 100 communicates with a plurality of secondary stations 110. These secondary stations 110 are typically handheld devices including batteries 111 supplying a communication device 112. To extend the operation time of the secondary stations without increasing the size of the batteries, it is currently desirable to reduce the power consumption of the secondary stations (or User Equipments (UEs)). In addition, if the battery charge becomes depleted, rather than exhaust the remaining energy, it would often be desirable to further reduce power and conserve energy, for example by adopting a more limited form of operation with reduced performance or fewer supported services.

It could be possible for example to transmit to the primary station a power limitation indicators, whose purpose is to allow the secondary station to indicate to the primary station and fixed network a condition of limited power availability. These indicators may be used to differentiate between devices that are mains-powered like secondary station 110b and those that are battery-powered or to indicate a low battery status.

When a secondary station registers for the first time (and on infrequent occasions thereafter), it indicates to the fixed network its capabilities via the UE Capabilities information elements or a UE category. This information could include, for example the number of UE Rx antennas and the maximum data rate that the UE can receive. The fixed network therefore has knowledge of what the UE is physically capable of doing and can instruct the UE to behave in accordance with network requirements and capacity, data delivery requirements and the UE's own operational limits.

It is to be noticed that it is difficult to define the threshold for signalling a change in status in a way that allows the primary station or fixed network to consistently respond in a meaningful way. Should it be sent at 50% battery capacity? 20%? 10%? Given that battery capacities vary according to the secondary station, like the battery size, technology and ageing and given that secondary station power consumption depends somewhat on implementation details, it would not be clear what, for example, "50% battery capacity" would actually mean for the secondary station. It is also not clear what it would mean for a user. Does he expect to be able to place the secondary station on charge or does he prefer to economise on energy consumption as much as possible?

As well as a shortage of battery power, the available signal processing power or signal reception capability of the terminal may also depend on whether other events occurred or features (such as reception of MBMS (Multicast/Broadcast Multimedia Services) or other transmissions or processing the output of a video camera) are currently in use or not.

SUMMARY OF THE INVENTION

It is an object of the invention to propose a method for operating a secondary station which offers more flexibility with respect to the management of the secondary station resources, and in a particular embodiment for battery remaining charge.

It is another object of the present invention to propose a mobile communication system in which the secondary station operates in accordance with an operation mode being adapted to the current situation.

It is an aim of the present invention to provide a mechanism that enables the secondary station to indicate explicitly, flexibly and clearly to the fixed network what its current operating priorities and capabilities are. For example, how it would like to conserve power, or whether all the terminal processing power is currently available. It is also an aim of the present invention to enable the user's preference to be taken into consideration. It is also an aim of the invention to enable the mechanism proposed to be adapted in scope to match secondary stations' implementations having different capabilities.

In accordance with method for operating a secondary station, said secondary station comprising communication means for communicating with a primary station, the method comprising the steps:

(a) of the secondary station signaling a first subset of operating profiles out of a plurality of available operating profiles (b) of the secondary station signaling at least one preferred operating profile out of the first subset of operating profiles in response to an event.

As a consequence, when the secondary station needs to operate in accordance with a new operating profile, instead of signalling the event, it can already chose an appropriate operating profile. Then the primary station is able to approve or reject or propose another operating profile. This allows a higher flexibility and signalling efficiency. The secondary station can thus propose in a timely manner an appropriate operating profile with respect to the conditions encountered and the capabilities available.

The present invention also relates to a secondary station comprising communication means for communicating with a primary station, the communication means being arranged for transmitting a first subset of operating profiles out of a plurality of available operating profiles, and transmitting an indication of at least one preferred operating profile out of said first subset of operating profiles in response to an event.

In accordance with another aspect of the invention, it is proposed a primary station comprising communication means for communicating with a secondary station, the communication means being arranged for receiving from the secondary station a first subset of operating profiles out of a plurality of available operating profiles, and receiving at least one preferred operating profile out said first subset of operating profiles in response to an event, and control means for deciding whether the communication means need to be changed in accordance with the preferred operating profile.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
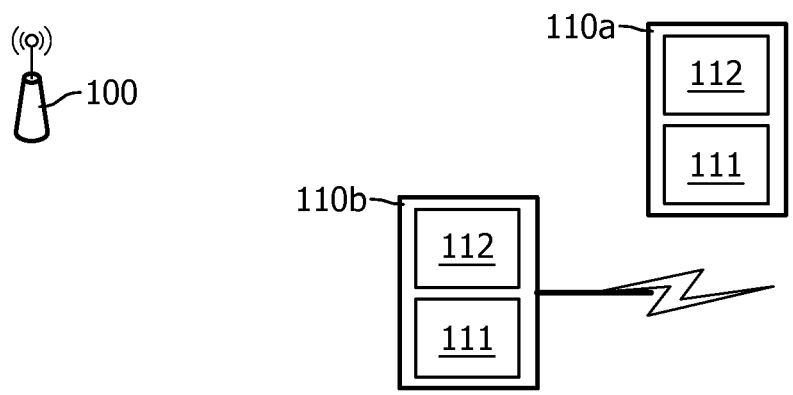
FIG. 1, already described is a block diagram of a system in which the invention is implemented.

The present invention relates to a network as illustrated on FIG. 1. As explained before, this network includes a primary station 100 communicating with a plurality of secondary stations 110. These secondary stations 110 are typically handheld devices including batteries 111 supplying a communication device 112. The communications between the primary station 100 and the secondary stations takes place on downlink and uplink channels. With the evolution of the technology, and in particular for mobile telecommunication with Long Term Evolution of UMTS, several different transmission modes are possible. For example, in LTE, MIMO communications are enabled thanks to arrays of antennas on the primary station and on the secondary stations. However, these transmission modes may require a great amount of resource and energy which may not be always available. For example, on FIG. 1, secondary station 110a has a low battery charge and is likely to run out of battery soon if the communication mode used is energy greedy.

On the contrary, the secondary station 110b is currently connected to an energy source like the electricity mains and does not need to save his energy.

As a consequence, in accordance with an embodiment of the invention, a secondary station supplements its current single set of capabilities by indicating to the fixed network, here the primary station 100 one or a plurality of alternative capability sets/profiles or operating profiles. This set of operating profiles is a subset of full set of the existing UE capabilities or possible operating profiles. Moreover, in an optional variant of this embodiment, the secondary station can include additional information like preferred parameter values, or maximal reachable parameters values. The secondary station may then, and on future occasions, indicate to the fixed network that it would like to switch from one capability set/profile to another as its operational requirements change. The expected behaviour of the fixed network is that, where possible, it will respect the restrictions proposed by the secondary station (from the start of the next frame/other timing epoch).

It is possible for the secondary station to signal only an index or an indication of a profile rather than the whole profile. This is more efficient in terms of signalling overhead than sending the full profile details, particularly if the operating profile is changed frequently. However, this requires
- either that the profiles are predetermined and stored in profiles libraries in the primary station and the secondary stations, or
- that the profiles are established in a initialization phase. This offers more flexibility in the implementations of the profiles, since these can be adapted with the ageing of the secondary stations or when new Operating System is installed on such secondary stations. However, this may require a quite long initialization phase with an important amount of resource and may require to be repeated at each reconnection.

Figure 2:
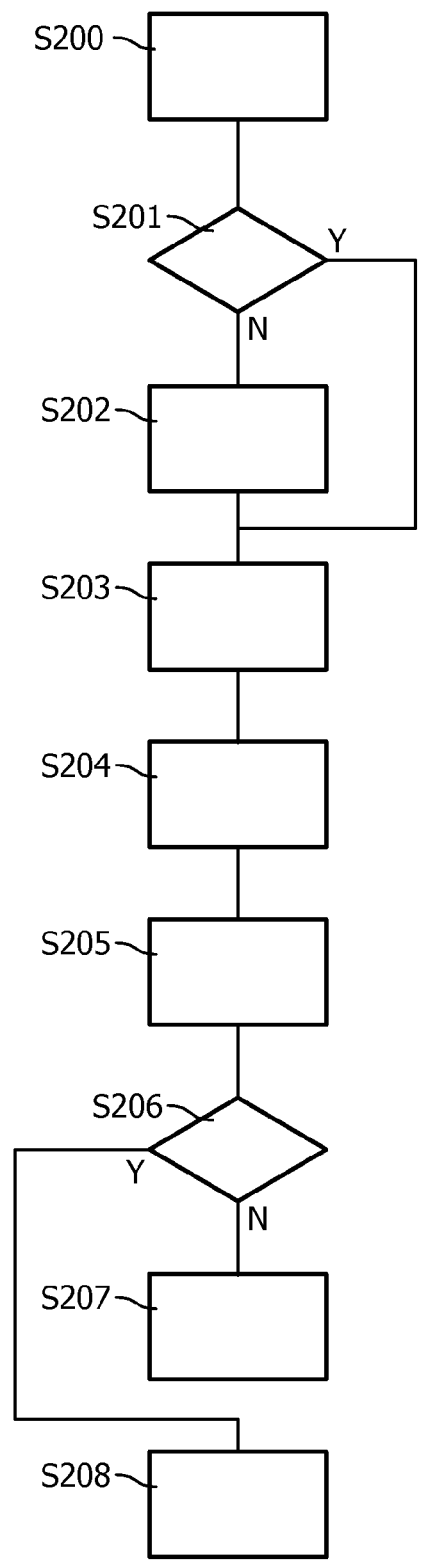
FIG. 2 is a flow chart representing a method in accordance with an embodiment of the present invention.

In accordance with the latter solution illustrated on FIG. 2, at step S200, the secondary station 110 enters the network. For example, the mobile phone is switched on or it enters in a cell served by a primary station 100 that offers the possibility of using and selecting different profiles. During step S200, the secondary station 110 is registered by the fixed network, here the primary station 100. After registration, the primary station checks whether operating profiles are stored that correspond to this secondary station registered on a central database or on a storage in the primary station S201. If this is the case, the method goes directly to the operation phase. Otherwise, the secondary station stays in the initialization phase and transmits to the primary station 100 a list of operating profiles at step S202. In a variant of this embodiment, the secondary station just provides with details regarding the model or the brand of the communicating device. Then, the primary station can find from a database a list of operating profiles from the secondary station manufacturer for example and corresponding to the secondary station 110.

Once the primary station 100 has a list of operating profiles corresponding to the secondary station, the secondary station 110 enters into operational phase S203. By default, the secondary station uses a default profile. It is also possible to ask for a different operating profile during the initialization phase so that the secondary station operates directly with this operating profile.

Then, at step S204, the secondary encounters a particular event causing it to wish change its operating profile. In accordance with this embodiment, a new profile is selected as a preferred profile by the secondary station on the basis of an event occurring at the secondary station side. Then, the secondary station is able to signal to the primary station or the fixed network the preferred profile that the secondary station intends to use in the future. This event triggering this selection and signalling of a new profile may include one change in the following:

- Mains/battery power source: the secondary station has just be (dis)connected (from) to the mains.
- Available battery power level: the battery power charge just reached a predetermined threshold or critically low level. This level may be configured by the user to adjust according to his preferences.
- User requirements.
- Tariffs.
- Location.
- Handover.
- Activation of MBMS.
- Change in data rate.
- Service requirements (e.g., performance optimisation for MBMS)
- Handover requirements.
- Operation within femto-cell or relay coverage area.
- Network service or traffic management requirements.
- Network power management requirements.

Such triggers could result in the secondary station generating a request to change profile (e.g. to a specific profile) at step S205. In a variant, this event could lead to the network requesting the secondary station to indicate a preferred profile.

Figure 3:
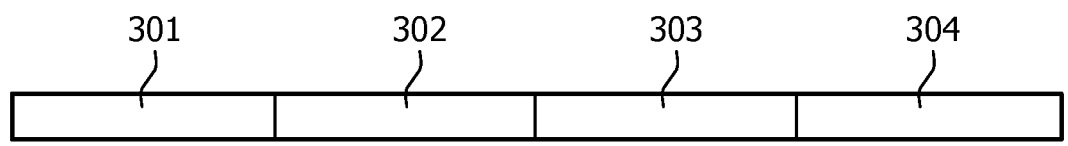
FIG. 3 is a diagram representing schematically a request for changing an operating profile in accordance with an embodiment of the invention.

An example of such request for new operating profile is represented on FIG. 3. This operating profile may be signalled on a control channel or by higher signalling. Accordingly, if it uses non UE specific resources, it will require a preamble 301 identifying the secondary station. Then, the request may comprise an index 302 being representative of the preferred operating profile. It is also possible to have a further field 303 in this request regarding some parameters values of the operating profile. Indeed, to obtain a finer adjustment of the profile, it is possible to indicate a limitation on the number of communication streams in a MIMO transmission, or a maximal data rate achievable. Moreover, in the specific exemplary request of FIG. 3, it is possible to have an indication of the previous operating profile currently used 304.

In the example of FIG. 3, only one preferred operating profile was signalled. However, in other embodiments of the invention, it is possible to signal a list of preferred profiles, for example with an order of preference.

In another variant, it is possible to also indicate the preferred profiles in full with the corresponding indices, in a learning phase. This permits to spread the huge requirements of resources over the first changes of operating profiles. Then, once the secondary station has used and signalled the profiles, it just uses the indices. In another variant, the secondary station requests preferred operating profiles by using the indices and the primary station requires the full description of the profile if these indices are unknown or cannot be retrieved from a central database or embedded storage.

Once the primary station 100 has received the operating profile sent at step S205, the primary station decides on whether this request should be accepted at step S206. If it is not accepted, the primary station may signal an operating profile that must be used by the secondary station. For example, it signals again the current profile such that the secondary station does not change. Or it can signal a new operating profile to be used at step S207. The operating profile can be indicated by a flag of only a few bits, which is much more efficient that signalling a new profile in full. This can be done with a quite similar signalling message as the request for change represented in FIG. 3. If the preferred profile signalled by the secondary station at step S205 is agreed, an Acknowledgement may be transmitted at step S208.

In principle, this mechanism provides a finer degree of control that allows the secondary station to take into account operational requirements. A profile can include indication on:
  Mains/battery power source.
  Available battery power level.
  Preferred DRX cycle length.
  Data rate supported (in UL and DL).
  Number of Tx/Rx antennas.
  Operating bands supported.
  Support for FDD/TDD/Half duplex.
  Number of aggregated carriers supported (e.g. in different bands).
  Modulation modes supported.
  MIMO modes supported.
  MBMS data rate supported.
  Handover capability.
  Support for closed user group.
  Interference environment (influencing processing required for interference suppression).
  Operation within femto-cell or relay coverage area.

Some operational requirements might not be well-expressed by the current UE capabilities IE, even if extended in release 10 and beyond. Accordingly, the capability sets are extended to define the preferred operation of features like, for example, the maximum number of carriers used in CA, the number of antennas used in MIMO operation and others that will be apparent to those skilled in the art.

Further, the uploaded capability sets may be defined independently of the format of UE capabilities IE.

The invention may be applied to Radio Technology selection based on available battery power. For example switch to from LTE to GSM to maintain a low power voice call.

The User may be allowed to select priorities (e.g. override power saving to continue with a power consuming application)

Another embodiment comprises a system like LTE-A. The following steps are executed.
  On registration (or at other times) the UE signals a category which indicates basic capabilities.
  On request from the network the UE signals a plurality of capability profiles, and an indication of a preferred profile.
  The network may accept or reject each profile
  The network may signal modified or alternative profiles
  The network confirms which profile will be used for further operation.
  When a trigger condition is reached the UE signals an indication of a preferred profile to the network.
  The indication may be carried efficiently by physical layer signalling
  The indication may be carried reliably by L2 or L3 signalling
  The network confirms which profile will be used.

Note that not all the above steps may be essential for the technical effect of invention to be achieved.

As a variation, the capability profiles are derived by default from the secondary station category.

As a further variation, the UE may request upload of new or replacement profiles As a further variation the network does not confirm the profile selection.
  The network may nevertheless activate the requested profile or an alternative
  The network may thus ignore the UE request As a further variation, when a trigger condition is reached, the network may signal an indication of new profile to the UE.
  In order, for example, to enable traffic or power management or for other service requirements, the network may reduce unnecessary signalling by restricting the available UE functionality.

As a further variation, the profile returns to a default value after a time-out period.

As a further variation, the profile cannot be selected if the current UE configuration exceeds the capabilities permitted by the profile
  The network may ignore or reject the profile
  The network may store the profile pending UE reconfiguration As a further variation, the new profile is not implemented immediately but at a well-defined moment:
  At a frame or sub-frame boundary
  At a break in U-plane traffic transfer (when the connection can be reconfigured).

In a further embodiment, the details of one or more profiles may be determined implicitly (i.e. without explicit signalling). In an example related to downlink transmission, in the case of the LTE-Advanced a secondary station may signal to the network that it can support a given total bit rate, and that it can also operate simultaneously with more than one LTE carrier (i.e. carrier aggregation, with an indicated number of carriers) and that it can also operate simultaneously with LTE and one or more additional radio technologies (e.g. CDMA2000). In this example one profile could correspond to the total bit rate that and number of carriers can be supported using LTE carrier aggregation (without simultaneous use of any other radio technology) being those signalled. Another other profile could correspond to the total bit rate (less a pre-determined amount for another radio technology) and a number of carriers for LTE carrier aggregation (less the number of carriers required for another radio technology). The secondary station may signal to the network which profile is currently applicable.

In a variation of this embodiment, the secondary station indicates (e.g. when attaching to the network) that it may later switch between the profiles. By observing the secondary station behaviour (e.g. whether granted transmission resources are actually used), the network may be able to determine which profile the secondary station is currently using. This approach could be used whether the details of profiles are explicitly or implicitly signalled. Thus, no resource is used for signalling the currently used profile since it is deduced by the primary station.

In a further variation, there is no explicit indication to the network of the current profile, or that the UE may change profiles, but the system design is such that the network is aware that at least a subset of UEs with certain capabilities may switch profiles. The network may be able to identify which profile a UE is following and react accordingly (e.g. with appropriate resource allocations).

The invention may be applicable to mobile telecommunication systems like UMTS LTE and UMTS LTE-Advanced, but also in some variants to any communication system having radio stations with limited capabilities.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for managing the operation of a secondary station, said secondary station comprising communication means for communicating with a primary station, the method comprising the steps of:
   (a) signalling from the secondary station to the primary station, a first subset of operating profiles out of a plurality of available operating profiles, and
   (b) signaling from the secondary station to the primary station, at least one preferred operating profile out of the first subset of operating profiles in response to an event detected by the secondary station corresponding to a change in the operational requirements of the secondary station
   (c) receiving from the primary station a response signal, wherein said response signal:
   confirms or rejects the at least one preferred operating profile, or
   is indicative of one of the preferred operating profiles signaled by the secondary station at step (b), or
   indicates a further operating profile alternative to the at least one preferred operating profile signaled by the secondary station at step (b).

2. The method of claim 1, wherein the event comprises the secondary station receiving a signal from the primary station for, at least one of the following:
   the energy remaining in a battery of the secondary station is below a predetermined level,
   the secondary station is connected to a permanent source of power,
   the secondary station has entered a particular location,
   a handover from communication with a previous primary station to communication with a current primary station,
   the activation of a particular service,
   the deactivation of a particular service,
   a user of the secondary station has requested a preferred operating mode,
   a change of hardware resources available to the secondary station.

3. The method of claim 1, wherein at least one of the current primary station or the previous primary station is a relay or a femto cell primary station.

4. The method of claim 1, wherein step (b) further comprises transmitting an index representative of a preferred operating profile.

5. The method of claim 1, wherein step (b) comprises transmitting an index and at least one preferred parameter value to be used with said preferred profile.

6. The method of claim 5, wherein the preferred parameter value is at least one of a number of antennas to be used in MIMO, a preferred data rate, a maximum number of carriers, one or more preferred operating bands.

7. The method of claim 1, wherein prior to step (a), the secondary station transmits to the primary station a list of the plurality of the available operating profiles that the secondary station is able to follow.

8. The method of claim 1, wherein at least one of the preferred operating profiles uses one of the GSM standard or the UMTS standard or the LTE standard.

9. The method of claim 1, further comprising a step of,:
   using a preferred operating profile in response to an allowance from the primary station, following step (b), or otherwise
   using a preferred operating profile in response to an instruction from the primary station, following step (b), or otherwise
   reverting to a previously used operating profile in response to a reject message from the primary station or to a timeout expiry, following step (b).

10. The method of claim 6, wherein the allowance is deduced from one of:
    a timeout expired,
    an acknowledgement message,
    a signaling of a parameter value being of use in the preferred operating profile, and
    wherein the instruction comprises transmitting an index representative of a preferred operating profile.

11. The method of claim 1, wherein step (a) further comprises transmitting a set of indices representative of the first subset of operating profiles.

12. The method of claim 1, wherein the secondary station can support simultaneous communications using at least two carriers, and wherein each of the at least two carriers use one representative standard.

13. The method of claim 10, wherein at least one profile has a total supported bit rate corresponding to two carriers used by one standard and another profile using one carrier has the same total supported bit rate less an amount corresponding to the total supported bit rate on another carrier using a different standard.

14. A secondary station comprising communication means for communicating with a primary station, wherein the communication means being arranged for transmitting to a primary station a first subset of operating profiles out of a plurality of available operating profiles, and transmitting said first subset of operating profiles in response to an event detected by the secondary station corresponding to a change in the operational requirements of the secondary station; and receiving from the primary station a response signal, wherein said response signal: confirms or rejects the at least one preferred operating profile, or is indicative of one of the preferred operating profiles signaled by the secondary station at step (b), or indicates a further operating profile alternative to the at least one preferred operating profile signaled by the secondary station at step (b).

15. A primary station comprising communication means for communicating with a secondary station, wherein the communication means being arranged for receiving from the secondary station a first subset of operating profiles out of a plurality of available operating profiles, and receiving at least one preferred operating profile out of said first subset of operating profiles in response to an event detected by the secondary station corresponding to a change in the operational requirements of the secondary station, and control means for determining whether the communication means need to be adapted in accordance with the preferred operating profile, wherein in the case where said control means determines that a change in the operational requirements of the secondary station is needed, the control means sending a response signal to the secondary station, wherein said response signal: confirms or rejects the at least one preferred operating profile, or is indicative of one of the preferred operating profiles signaled by the secondary station at step (b), or indicates a further operating profile alternative to the at least one preferred operating profile signaled by the secondary station at step (b).

* * * * *